Feb. 10, 1970 L. A. HARWOOD 3,495,193

VARIABLE RADIO FREQUENCY ATTENUATOR

Filed Oct. 17, 1966

INVENTOR
Leopold A. Harwood

BY Eugene M. Whitacre
Attorney 3,495,193

VARIABLE RADIO FREQUENCY ATTENUATOR

Leopold A. Harwood, Somerville, N.J., assignor to Radio Corporation of America, a corporation of Delaware Filed Oct. 17, 1966, Ser. No. 587,100
Int. Cl. H01p *1/22*
U.S. Cl. 333—81 4 Claims

ABSTRACT OF THE DISCLOSURE

An active radio frequency attenuator circuit includes a transformer having an input, output, and control windings. The signal to be attenuated is applied to both the input and control windings in such a manner that a signal is induced in the output winding which is proportional to the difference in amplitude between the signals coupled to the input and control windings. Means are also provided for varying the amplitude of the signal applied to the control winding in such a manner as to control the amplitude of the resultant signal produced in the output winding.

This invention relates to a device which provides a controlled attenuation of electrical waves. This invention has particular applicability in automatic gain control (AGC) circuitry.

In the prior art AGC is typically provided by a voltage, derived from the detected signal, which was used to vary the amplification of the input and intermediate amplifying stages by changing the bias voltage applied to these stages. This method is less useful at higher frequencies and in narrow band circuits, especially in transistor receivers. In transistors, variation of the operating point produces changes in the transconductance characteristic and input capacitance which respectively may give rise to such problems as cross modulation distortion and detuning of the input circuit. It is therefore desirable, especially in transistor receivers, to provide controlled attenuation at the antenna terminals to limit the dynamic signal handling requirements of the input circuitry. It is necessary that the attenuator have a low insertion loss and also be capable of low impedance design so that it may be easily adopted for use in antenna circuits which are generally of low impedance.

An object of this invention is to provide an improved device which variably attenuates electrical waves and particularly those at radio frequencies.

Another object is to provide an improved variable attenuator whose attenuation is a function of an applied control voltage.

Another object is to provide an improved variable attenuator which exhibits low insertion loss and is capable of efficient use in low impedance receiver input circuits.

An active radio frequency (RF) attenuator embodying the invention includes a transformer having three windings, where two are the input and output windings, and the third is a control winding. The signal to be controlled is applied to the input winding and is also applied to the control winding in such a manner that a signal is induced in the output winding which is proportional to the difference in amplitude between the signals coupled to the input and control windings. The amount of the signal applied to the control winding is varied to control the amplitude of the resultant signal in the output winding.

Other objects, features and advantages will appear from the drawings and descriptions hereinafter given. Referring to the drawings.

Figure 1:
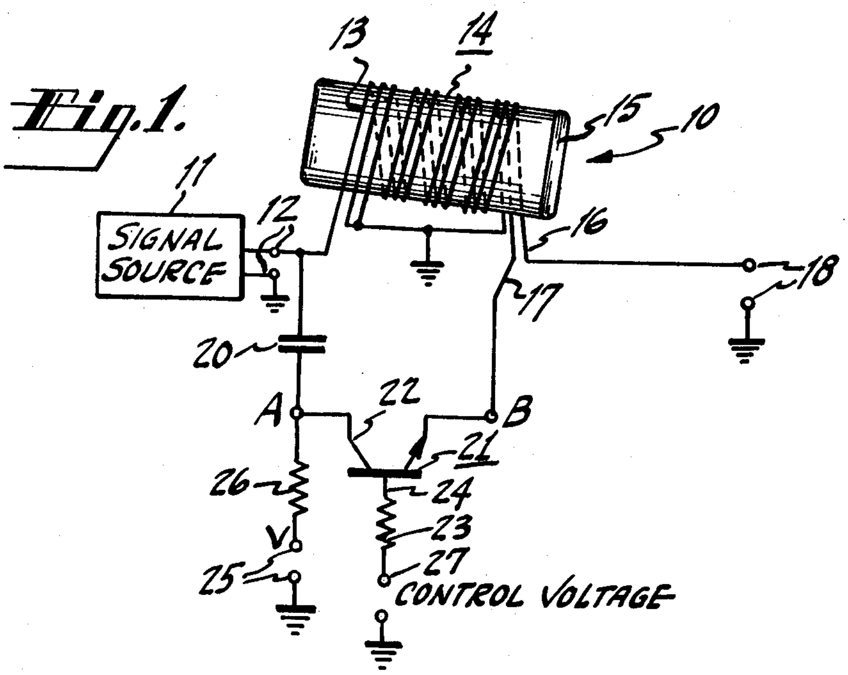
FIGURE 1 is a schematic circuit diagram of a radio frequency attenuator embodying the invention.

An active RF attenuator 10 suitable for operation over the VHF television band is shown in FIGURE 1. The attenuator includes a transformer 14 having substantially unity coupled trifilar windings which comprise respectively, an input winding 13, an output winding 16 and a control winding 17. By way of example, the transformer 14 may includes three trifilar close wound turns of 20 gauge wire wound around a flat ceramic ferrite core 15 which is ¾″ long by 7⁄16″ wide by 3⁄32″ thick. As shown in the drawings, the control winding is positioned intermediate the input and output windings. The spacing between the windings is adjusted to determine the characteristic impedance, such as, for example, 75 ohms which is suitable for coupling a 75 ohm signal source to a 75 ohm lead.

A signal source 11 is coupled across the input winding 13 by way of the pair of input terminals 12. In addition, the signal source 11 is also coupled across the control winding 17 by way of a direct current blocking capacitor 20 and a transistor 21. Signal currents flow in opposite direction through the windings 13 and 17 and induce opposite and cancelling voltages in the output winding 16.

The collector electrode 22 of the transistor 21 is connected through a resistor 26 to a voltage source V, not shown, adapted for connection between the terminals 25. In addition, the base electrode 24 of the transistor 21 is connected through a resistor 23 to a control voltage terminal 27. The control voltage, which determines the amount an RF signal will be attenuated, may comprise an automatic gain control voltage. In the present instance, more attenuation of the RF signal is introduced as the control voltage becomes more positive. Thus, where the control voltage is an AGC voltage, it tends to become more positive as the level of signals from the source 11 increases.

For minimum attenuation of RF signals by the circuit 10, the control voltage is of a value to cut off the transistor 21 thereby substantially blocking signal current flow in the control winding 17. Under these conditions signal current in the input winding 13 induces a voltage in the output winding 16 of substantially the same amplitude as the input voltage. To increase the attenuation of RF signals by the circuit 10, the control voltage applied between terminals 27 forward biases the base-emitter junction of the transistor 21 to reduce its dynamic collector resistance. Under these conditions signal current flows through the control winding 17 and develops fields which oppose the fields developed by the signal currents flowing in the input winding 13. As a result, a reduced or attenuated output voltage is developed across the output winding 16.

The voltage from the source V, the resistance of resistor 26 and the control voltage applied to the base electrode 24 are proportioned such that the transistor 21 is operating in a saturated condition for maximum signal attenuation. The particular values of these components establish the range of collector-to-emitter resistance for a given range of control voltages.

Figure 2:
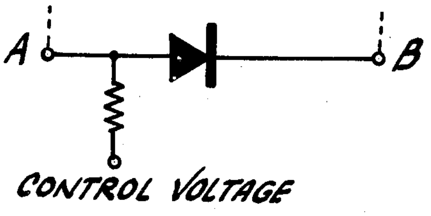
FIGURE 2 is a schematic diagram of an alternative circuit which may be connected between the terminals A and B of FIGURE 1.

FIGURE 2 illustrates a circuit including a PIN diode 28 which functions as a variable resistance. This circuit is inserted across terminals A and B in lieu of the transistor 21 shown in FIGURE 1. A suitable type of PIN diode for this purpose is a 1N367, and comprises P and N type semiconductor regions separated by a region of intrinsic semiconductor material. A control bias applied to this type of diode will vary its effective resistance over an extended range from about 10 ohms to a very high resistance. An important feature of this type of diode is its linear voltage-current characteristic which is necessary to achieve attenuation without the introduction of excessive cross modulation distortion. The circuits employed in both of the embodiments shown work well at VHF television frequencies.

Attenuators of the type described are also useful at UHF television frequencies. Approximate dimensions of the attenuator for UHF operation would be about three turns wound upon a 3/16″ ferrite rod of about ½″ in length. Also at those frequencies, a low capacity PIN diode would be used as described in connection in FIG. 2, but the general circuit would be unchanged.

Figure 3:
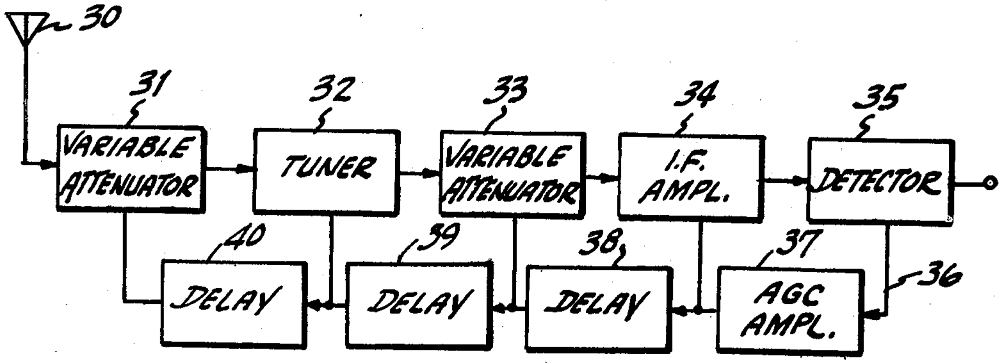
FIGURE 3 is a block diagram illustrating the use of radio frequency attenuators embodying the invention in a signal translating system.

FIGURE 3 shows a receiver circuit which illustrates the use of active attenuators as above-described. Because of its low impedance capability the variable attenuator 31 may be employed between the antenna 30 and a tuner 32 which includes a radio frequency amplifier. The attenuator itself may be a physical part of an antenna input or impedance matching circuit. The attenuator in this position prevents overloading of the input amplifier stage and therefore reduces cross modulation distortion. Another variable attenuator 33 is shown between the output of the tuner 32 and IF amplifier stages 34. This attenuator is used to eliminate detuning of the IF networks due to overloading at its input. The control signal for the attenuator is developed by the detector 35 fed into an AGC amplifier 37 through line 36. It is then applied to an intermediate frequency (IF) amplifier 34 and to the variable attenuators 31 and 33 and the tuner 32. Delay means 38, 39 and 40 may be included, if desired, to control the time of application of the AGC voltages to the various amplifying stages and attenuators as a function of received signal levels.

What is claimed is:

1. A variable attenuation circuit comprising:

a transformer having mutually coupled input, output and control windings, said windings being wound in a substantially trifilar configuration to provide substantially unity coupling therebetween, with the turns of the windings of said trifilar configuration being in a helical arrangement in spaced groups of three:

means providing a signal source;

means coupling said signal source to said input winding so that signal currents flowing in said input winding induce signal voltage of a first polarity in said output winding;

impedance means coupling said signal source to said control winding so that signal currents flowing in said control winding induce signal voltages in said output winding of opposite polarity to said first polarity; and active circuit means electronically controlled and operative to vary the impedance of said impedance means to control the amplitude of signal currents flowing in said control winding.

2. The device as set forth in claim 1 in which said impedance means is a PIN diode connected in series between said signal source and said control winding, and including a direct voltage supply connected across said PIN diode for controlling the impedance thereof.

3. The device as set forth in claim 1 in which said impedance means comprises a transistor having collector, emitter and base electrodes, said transistor collector and emitter electrodes being connected between said signal source and said control winding, and control voltage means connected to said base electrode for controlling the collector-to-emitter impedance of said transistor.

4. A variable attenuator device for attenuating electrical waves comprising:

a transformer having three mutually coupled windings, said windings being wound in a substantially trifilar configuration to provide substantially unity coupling therebetween, with the turns of the windings of said trifilar configuration being in a helical arrangement in spaced groups of three;

means coupling the electrical waves to be attenuated to two of said windings to develop mutually opposing fields;

active circuit means electronically controlled and operative to vary the amplitude of said waves in one of said two windings such that the resultant wave induced into the third winding is proportional to the difference in amplitude between the electrical waves coupled to said two windings.

References Cited

UNITED STATES PATENTS

| | | | |
|---|---|---|---|
| 1,817,294 | 8/1931 | Cutting et al. | 333—24 |
| 2,808,474 | 10/1957 | Maynard et al. | |
| 3,093,802 | 6/1963 | Chow | 333—81 XR |
| 3,168,715 | 2/1965 | Woodworth | 333—11 |
| 3,260,965 | 7/1966 | Schmal. | |

OTHER REFERENCES

"Wide Band Transistor Variable Attenuators," Watanabe et al., Proceedings of the IEEE, vol. 53, May 1965, TK 5700 I7 page 550.

hpa Application Note 904, "The Pin Diode," Feb. 15, 1966, hp associates, Palo Alto, Calif., pages 1–16.

HERMAN K. SAALBACH, Primary Examiner

M. NUSSBAUM, Assistant Examiner

U.S. Cl. X.R.

332—17